3,705,117
PROCESS FOR THE MANUFACTURE OF LIGHT BUILDING ELEMENTS
Silvio Vargiu and Mario Pitzalis, Milan, and Pierluigi Abruzzi, Bergamo, Italy, assignors to Societá Italiana Resine S.p.A., Milan, Italy
Claims priority, application Italy, Dec. 23, 1969, 26,205/69
No Drawing. Filed Dec. 14, 1970, Ser. No. 98,102
Int. Cl. C08f 47/08
U.S. Cl. 260—2.5 B                14 Claims

ABSTRACT OF THE DISCLOSURE

Lightweight concrete building elements are made by a process in which the action of epoxy binders for the polystyrene granules is assisted by the presence of an organic solvent, preferably benzene, toluene or xylene.

---

The present invention relates to improvements in methods of manufacturing light building elements, more precisely relating to building artifacts comprising a hydraulic binder and expanded plastics material. The prior art includes various types of light building materials normally described as "light concretes," such as for example those which have their own porosity (foam structure) and those which are obtained by incorporating light substances. Of these latter, particular interest has been given to those manufactured materials having a density equal to or less than approx. 0.8 kg./cu. dm., which comprise a hydraulic binder and expanded polystyrene.

Such products, which find application in the field of lightweight prefabrication, are obtained by hardening cement, water and expanded polystyrene in granular form.

It is well known that various advantages are obtained in the manufacture of such "light concretes" by using adhesive substances. More particularly, the particles of expanded polystyrene are treated by an aqueous dispersion of the adhesive prior to mixture with the hydraulic binder.

In this way, advantages are obtained both for the easy homogenisation of the mixtures which are submitted to hardening and for the improved characteristics of the manufactured items obtained from such mixtures.

Preferred adhesives are those compounds of condensation between epichlorohydrin and polyhydric alcohols or polyhydroxy phenols, known in the art as polyepoxides.

The manufactured building materials which are thus obtained do not however have completely satisfactory characteristics. In particular, the mechanical properties of such manufactured materials are often not sufficiently high as to make them useful for all the purposes to which they are usually allocated.

It has now been found possible substantially to improve the mechanical properties of manufactured building materials comprising a hydraulic binder and expanded polystyrene when the granular polystyrene is treated with particular liquid organic hydrocarbons as well as with adhesive, before homogenisation with the hydraulic binder.

The method according to the present invention is therefore based essentially on the expanded polystyrene particles being treated with an aqueous dispersion comprising an epoxy adhesive and an organic substance which is liquid under normal conditions, chosen from the group comprising the aliphatic or aromatic hydrocarbons.

Particularly preferred for the purposes of the present invention are benzene, toluene and xylenes.

The particles of expanded polystyrene which are thus treated are then homogenised with the hydraulic binder and the mixture is allowed to set.

In this way, manufactured materials are obtained which have rather high mechanical properties, being useful in building for lightweight prefabrication purposes.

In addition, such manufactured materials have optimum properties for heat and sound insulation, reduced moisture absorption, and easy working properties by using machines normally employed in building.

Thus, according to the process of the present invention homogenous mixtures comprising expanded polystyrene and a hydraulic binder are subjected to sitting in the manufacture of materials for building, with densities of 0.2 to 0.8 kg./cu.dm. In particular, polystyrene in granule form is used, the granules being of diameters up to 3 mm., closed cell, with an apparent density in the mass of approx. 16 to 28 kg./cu.m.

Before being mixed with hydraulic binder, the said polystyrene is treated with a dispersion of an epoxy glue in water, and an organic solvent selected from among those previously defined.

More precisely according to the process of the present invention, the glues used are the polyepoxy glues defined as products of condensation of epichlorohydrin with polyhydric alcohols or polyhydroxy phenols, and in particular those liquid products obtained by the condensation of epichlorohydrin with diphenol having an epoxy equivalent of 180 to 220 and a viscosity of 6000 to 25,000 c.p.s.

In the preferred form, the glues used are mixtures of polyepoxy compounds and alkyl glycidyl ethers or aryl glycidyl ethers.

It has been found that the best results are obtained with proportions by weight of polyepoxy compound to monoepoxy compound of between 0.3:1 and 1:1.

According to the process of the present invention, aqueous dispersions comprising the glues and organic solvents described are used in the treatment of expanded polystyrene in granular form before the admixture of the hydraulic binder. More particularly, a quantity of glue ranging from 1 to 8 kg. per cu.m. of expanded polystyrene is used for preference.

The quantity of organic solvent used is maintained at between 0.1 and 4.0 kg. to every cu.m. of particles of polystyrene.

It has in fact been found that for less than approx. 0.1 kg. per cu.m. of polystyrene, no appreciable improvements are obtained in the properties of the "light concretes," whereas quantities of solvent above approx. 4.0 are not advisable because they cause phenomena of dissolution of the particles of polystyrene.

According to the process of the present invention, the aqueous dispersions of organic solvent and epoxy glue contain one or more hardeners for the epoxy compound. Such hardeners are selected from those normally known in the art such as for example: methylene diamine, triethylene tetramine and the phenyl glycidyl ether and tetraethylene pentamine based additives. Such hardeners are used in quantities of 10 to 30 parts by weight per 100 parts by weight of epoxy compound. The aqueous dispersion is also obtained by means of substances of the surface active type, such as for example aryl sulphonates, alkyl aryl sulphonates, the products of condensation of ethylene oxide with phenols or alkyl phenols, and the sulphonated alcohols such as sodium lauryl sulphonate.

It has been found that the best results are obtained by homogenising the epoxy compound containing the hardener with the surface active agent or preferably with a mixture of several surface active agents dispersed in a little water, after which a further quantity of water and the organic solvent selected can be added to the resultant mixture which is maintained under brisk agitation.

In this way, aqueous dispersions are obtained which remain stable for several hours, useful in the treatment of the expanded polystyrene particles.

Thus, in a preferred form of embodiment, an aqueous dispersion containing from 5 to 15% by weight of a mixture of surface active media chosen from the following classes of compounds: sulphonated alcohols and products of addition of alkyl phenols and ethylene oxide is first prepared.

Then, from 0.05 to 0.2 part by weight of such dispersion to every part by weight of the epoxy glue containing the hardener will be homogenised.

To the resultant mixture must then be added water and the organic solvent, stirring briskly, until the concentration of glue in the dispersion is 5 to 20% by weight.

Obviously the quantity of organic solvent present in the dispersion will be such as to fall, in the subsequent treatment of the polystyrene particles, within the limits of concentration set out hereinabove.

After being coated with the dispersions described, polystyrene particles are mixed with the hydraulic binder and with water until a homogeneous mixture is obtained which is then subjected to hardening.

In particular, the binders used may be normal cements of the type commercially known as 325, high strength cements (type 425), high strength and rapid hardening cements (type 525), aluminous cement (type 525), cements for retaining dams (type 225).

The proportion of weight between the cement and the polystyrene depends on the density of the manufactured material which it is intended to obtain, taking into account the bulk density of the expanded polystyrene used. To the mixture which is subjected to hardening, it is possible also to add inert substances such as for example sand, although the use of such substances is not proposed in the preferred embodiment.

Finally, the quantity of water in the mixtures subjected to hardening varies as a function of the quantity of cement used, generally the best results being obtained with proportions by weight of water:cement of 0.4:1 to 0.5:1.

The mixtures of the present invention may be hardened at ambient or at higher temperatures. In the manufacture of materials for building, such mixtures may be poured into appropriate moulds or may be extruded in machines suitable for the purpose.

The following experimental examples relate to the preparation and setting of homogeneous mixtures comprising: cement, water and expanded polystyrene.

Particularly listed are examples in which the particles of polystyrene are treated with aqueous dispersions of epoxy glue according to the prior art, and by means of aqueous dispersions comprising the epoxy glue and the organic solvent, according to the process of the present invention.

In every case, the hydraulic binder used is type 325 portland cement.

In the preparation of homogeneous mixtures, the cement, water and polystyrene treated with the aqueous dispersions, were poured into polyethylene vessels and the mixture was reblended for five minutes using a wooden spatula.

Samples were then prepared by pouring the homogenised mixture into moulds by means of a steel ladle.

The moulds used were made of wood which had been varnished to prevent the water being absorbed from the mixture. The samples were kept in the moulds for 24 hours under ambient conditions and then carefully extracted.

In particular, cylindrical samples were prepared with a height of 50 mm. and a diameter of 50 mm. for the compression strength tests.

In order to determine tensile strength, samples were prepared in a butterfly shape with a central portion to the following dimensions: height 22 mm. and width 22 mm. After the samples had been taken from the moulds, they were conditioned under three different ambients:

at ambient temperature and humidity;
at ambient temperature and humidity with a daily 60-second bath in water at 20° C.;
immersed in water at 20° C.

The tensile and compression strength tests were performed on samples after 2, 7 and 28 days of treatment under the various conditions described.

In particular, the compression strength was tested on cylindrical samples with a velocity of 5 mm./min., the tensile strength being tested on butterfly-shaped samples at a velocity of 10 mm./min.

EXAMPLE 1

Examples 1 to 3 are comparative

An aqueous suspension of surface active agents is prepared, consisting of: water 91.58, the product of condensation of nonyl phenol with 30 mols ethylene oxide 5.20, sodium lauryl sulphonate 1.48, and the product of condensation of nonyl phenol with 6 mols ethylene oxide 1.64 parts by weight.

A homogeneous mixture is then prepared by the addition of 0.1 part by weight of the dispersion of surface active agents to every part by weight of a polyepoxy compound containing the hardener. In particular, the epoxy compound used was a product of condensation between epichlorohydrin and diphenol to the following characteristics: epoxy equivalent 180–210 viscosity 9000 to 13,000 c.p.s.

Triethylene tetramine was used as a hardener, in quantities equal to 11 parts by weight for every 100 parts by weight of polyepoxide.

An aqueous dispersion of the mix was then prepared by the addition, under brisk agitation, of water in a quantity equal to 7.5 parts by weight for every part by weight of homogeneous mixture of the glue, the preparation of which has been described already.

In this test, expanded polystyrene was used in the form of beads with a diameter of 1 to 2.5 mm. and an apparent density in bulk of 16 kg./cu. m.

The said polystyrene is treated by the aqueous solution of glue, and in particular 1.94 parts by weight of dispersion are used for every part by weight of polystyrene. The mixture formed of: cement 460, water 192.5, expanded polystyrene and glue dispersion 51.5 parts by weight is then homogenised.

This homogenous mixture is poured into the moulds and finally the characteristic features of the hardened products are recorded, their density being equal to approx. 0.8 kg./cu. dm., from what is described herein.

The results are summarised in Table 1.

TABLE 1

|  | A | B | C |
|---|---|---|---|
| Compression strength, kg./sq. cm.: | | | |
| After 2 days | 8.0 | 6.7 | 8.0 |
| After 7 days | 10.3 | 9.7 | 11.3 |
| After 28 days | 11.9 | 11.5 | 12.7 |
| Tensile strength, kg./sq. cm.: | | | |
| After 2 days | 1.9 | 1.8 | 1.8 |
| After 7 days | 2.2 | 2.4 | 2.7 |
| After 28 days | 2.5 | 3.2 | 3.1 |

It should be noted that under A in Table 1 are listed the results of findings obtained on samples maintained under ambient conditions, while B shows the results with samples kept under ambient conditions and immersed every day for 50 seconds in water at 20° C., while the figures under C relate to samples kept immersed in water at 20° C.

These denominations will be maintained also in subsequent tables.

EXAMPLE 2

The same procedure was adopted as in Example 1, the hardener being the adduct of phenyl glycidyl ether and tetraethylene pentamine, in a quantity equal to 25 parts per 100 parts by weight of polyepoxy compound.

The results are summarised in Table 2.

TABLE 2

|  | A | B | C |
|---|---|---|---|
| Compression strength kg./sq. cm.: |  |  |  |
| After 2 days | 8.1 | 6.8 | 9.2 |
| After 7 days | 10.0 | 9.5 | 11.4 |
| After 28 days | 11.7 | 11.4 | 12.5 |
| Tensile strength kg./sq. cm.: |  |  |  |
| After 2 days | 1.8 | 1.7 | 1.5 |
| After 7 days | 2.3 | 2.1 | 1.9 |
| After 28 days | 2.4 | 3.3 | 3.0 |

EXAMPLE 3

The same procedure is adopted as in Example 1, the hardener used being methylene diamine in a quantity equal to 21 parts by weight per 100 parts by weight of polyepoxy compound.

The results are summarised in Table 3.

TABLE 3

|  | A | B | C |
|---|---|---|---|
| Compression strength kg./sq. cm.: |  |  |  |
| After 2 days | 8.5 | 8.0 | 8.0 |
| After 7 days | 11.6 | 11.8 | 11.8 |
| After 28 days | 11.8 | 14.2 | 11.8 |
| Tensile strength kg./sq. cm.: |  |  |  |
| After 2 days | 1.2 | 1.5 | 1.6 |
| After 7 days | 1.4 | 1.9 | 2.0 |
| After 28 days | 1.8 | 4.0 | 2.8 |

EXAMPLE 4

An aqueous dispersion of surface active agents is prepared as described in Example 1. An homogeneous mixture is then formed between the aqueous dispersion of surface active agents (15 parts), the polyepoxy resin described in the first example (40 parts), butyl glycidyl ether (60 parts) and the hardener consisting of the adduct of phenyl glycidyl ether and tetraethylene pentamine (25 parts). The parts are indicated by weight.

An aqueous dispersion is then prepared by adding, under brisk agitation, 7.5 parts by weight of water and 0.5 part by weight of xylene for every part by weight of homogenous mixture. In this test, expanded polystyrene as used with a density in the bulk equal to 16 kg./cu. m., of the type described in the previous example.

This polystyrene is treated with the aqueous dispersion of glue and xylene by using 1.94 parts by weight of the dispersion to every part by weight of polystyrene.

The mixture consisting of cement 560, water 192.5, polystyrene and aqueous dispersion of glue and organic solvent 51.5 parts by weight is then homogenised. This homogeneous mixture is poured into moulds and finally the properties of the hardened products are recorded, their density being equal to approx. 0.8 kg./cu. dm., as described herein.

The results are summarised in Table 4.

TABLE 4

|  | A | B | C |
|---|---|---|---|
| Compression strength kg./sq. cm.: |  |  |  |
| After 2 days | 12.5 | 13.0 | 12.5 |
| After 7 days | 15.5 | 15.0 | 15.5 |
| After 28 days | 16.5 | 16.0 | 16.5 |
| Tensile strength kg./sq. cm.: |  |  |  |
| After 2 days | 3.5 | 4.0 | 3.7 |
| After 7 days | 4.6 | 5.0 | 4.7 |
| After 28 days | 4.6 | 5.0 | 5.0 |

EXAMPLE 5

The same procedure is carried out as in Example 4 for the aqueous preparation of surface active agents and formation of the homogeneous mixture comprising the glue and the hardener.

The dispersion is then prepared for treatment of the polystyrene by the addition under brisk agitation of 7.5 parts water and 0.75 part xylene to every part by weight of homogeneous mixture.

Proceed then as described in Example 4. The results are summarised in Table 5.

TABLE 5

|  | A | B | C |
|---|---|---|---|
| Compression strength kg./sq. cm.: |  |  |  |
| After 2 days | 15.0 | 15.0 | 14.0 |
| After 7 days | 19.0 | 20.0 | 19.5 |
| After 28 days | 22.5 | 23.5 | 23.0 |
| Tensile strength kg./sq. cm.: |  |  |  |
| After 2 days | 5.0 | 5.0 | 5.2 |
| After 7 days | 5.5 | 6.0 | 5.8 |
| After 28 days | 6.5 | 7.0 | 7.0 |

EXAMPLE 6

Proceed as in Example 4 in the preparation of aqueous dispersion of surface active agents and in the formation of the homogenous mixture comprising the glue and the hardener.

The aqueous dispersion of glue and organic solvent is then prepared by the addition, under brisk agitation, of 7.5 parts of water and 1 part xylene for every part by weight of homogeneous mixture.

The same procedure is then adopted as described in Example 4. The results are summarised in Table 6.

TABLE 6

|  | A | B | C |
|---|---|---|---|
| Compression strength kg./sq. cm.: |  |  |  |
| After 2 days | 15.0 | 15.5 | 15.0 |
| After 7 days | 20.0 | 19.5 | 20.0 |
| After 28 days | 23.0 | 23.5 | 24.0 |
| Tensile strength kg./sq. cm.: |  |  |  |
| After 2 days | 5.5 | 5.5 | 5.2 |
| After 7 days | 5.8 | 6.2 | 6.2 |
| After 28 days | 7.0 | 7.0 | 7.0 |

EXAMPLE 7

A dispersion of surface active agents is prepared as described in Example 1.

An homogenous mixture is then formed between the aqueous dispersion of surface active agents (15 parts), the polyepoxy resin described in the first example (40 parts), butyl glycidyl ether (50 parts) and a hardener consisting of the adduct of phenyl glycidyl ether with tetraethylene pentamine (25 parts).

The parts are indicated by weight.

An aqueous dispersion is then prepared by adding, under brisk agitaion, 7.5 parts by weight of water and 0.75 part xylene for every part by weight of homogenous mixture.

In this text, expanded polystyrene is used with a density in bulk equal to 16 kg./cu. m. of the type described in the previous examples.

This polystyrene is treated with the aqueous dispersion of glue and xylene, using 2.11 parts by weight of dispersion to every part by weight of polystyrene.

Then, a mixture consisting of 560 parts cement, 192.5 parts water, 54.5 parts by weight polystyrene and aqueous dispersion of glue and organic solvent, is then homogenised. This homogenous mixture is poured into moulds and finally the properties of the hardened products are recorded, their density being equal to approx. 0.8 kg./cu. dm., as described herein.

The results are summarised in Table 7.

TABLE 7

|  | A | B | C |
|---|---|---|---|
| Compression strength kg./sq. cm.: | | | |
| After 2 days | 15.0 | 14.5 | 15.5 |
| After 7 days | 19.0 | 19.6 | 18.5 |
| After 20 days | 22.5 | 22.6 | 24.0 |
| Tensile strength kg./sq. cm.: | | | |
| After 2 days | 4.0 | 4.2 | 4.0 |
| After 7 days | 4.7 | 5.0 | 4.2 |
| After 28 days | 5.5 | 7.0 | 7.0 |

EXAMPLE 8

Using the same procedure as in Example 7, homogenise 415 parts cement, 137.5 parts water, 54.5 parts by weight polystyrene and aqueous dispersion of adhesive and organic solvent.

Hardening produces a material with a density equal to approx. 0.6 kg./cu.dm., the characteristics of which are summarised in Table 8.

TABLE 8

|  | A | B | C |
|---|---|---|---|
| Compression strength kg./sq. cm.: | | | |
| After 2 days | 12.0 | 11.7 | 11.5 |
| After 7 days | 13.0 | 12.6 | 12.7 |
| After 28 days | 13.3 | 12.6 | 14.0 |
| Tensile strength kg./sq. cm.: | | | |
| After 2 days | 2.8 | 3.0 | 3.0 |
| After 7 days | 3.2 | 3.8 | 3.7 |
| After 28 days | 3.2 | 4.0 | 4.0 |

EXAMPLE 9

Using the procedure set out in Example 7, homogenise 274 parts cement, 123.5 parts water, 54.5 parts by weight polystyrene and aqueous dispersion of glue and organic solvent. When set, this mixture produces a material with a density equal to 0.4 kg./cu.dm. and having the properties summarised in Table 9.

TABLE 9

|  | A | B | C |
|---|---|---|---|
| Compression strength kg./sq. cm.: | | | |
| After 2 days | 6.7 | 7.0 | 7.2 |
| After 7 days | 7.4 | 7.5 | 7.7 |
| After 28 days | 8.2 | 8.0 | 8.3 |
| Tensile strength kg./sq. cm.: | | | |
| After 2 days | 1.0 | 1.2 | 1.5 |
| After 7 days | 1.7 | 1.8 | 1.8 |
| After 28 days | 1.7 | 1.9 | 2.0 |

EXAMPLE 10

Proceed as in Example 7, homogenising 130 parts cement, 72.5 parts water, 54.5 parts polystyrene and aqueous suspension of glue and organic solvent.

When set, these mixtures produce a material with a density equal to approx. 0.2 kg./cu.dm. with the characteristic features characterised in Table 10.

TABLE 10

|  | A | B | C |
|---|---|---|---|
| Compression strength kg./sq. cm.: | | | |
| After 2 days | 1.5 | 1.2 | 1.5 |
| After 7 days | 2.1 | 2.0 | 2.0 |
| After 28 days | 2.3 | 2.5 | 2.7 |
| Tensile strength kg./sq. cm.: | | | |
| After 2 days | 0.5 | 0.5 | 0.4 |
| After 7 days | 0.5 | 0.5 | 0.4 |
| After 28 days | 0.5 | 0.5 | 0.4 |

We claim:

1. A process for the manufacture of light building elements having a density of 0.2 to 0.8 kg./cu. dm., by the hardening of mixtures comprising hydraulic cement, water and a homogeneous mixture of granular expanded polystyrene in an aqueous dispersion, characterised in that the particles of expanded polystyrene have a bulk density of 16 to 28 kg./cu. m., said aqueous dispersion comprising an epoxy binder and an organic solvent, said solvent being used in a quantity of 0.1 to 4.0 kg. to every cu. m. of particles of polystyrene, and being selected from the group consisting of aliphatic and aromatic hydrocarbons, said epoxy binder being a polyepoxy compound-monoepoxy compound mixture, the ratio by weight of polyepoxy compound-monoepoxy compound being between 0.3:1 and 1:1, and said granular expanded polystyrene being admixed with said epoxy binder before being blended with hydraulic cement and said water.

2. A process according to claim 1, in which the solvent is selected from the group consisting of benzene, toluene and the xylenes.

3. A process according to claim 1, wherein said polyepoxy compound is a liquid product of condensation of diphenol with epichlorohydrin with an epoxy equivalent of 180 to 220 and a viscosity of 6,000 to 25,000 c.p.s.

4. A process according to claim 1, wherein said monoepoxy compound is selected from the group consisting of an aryl glycidyl ether and an alkyl glycidyl ether.

5. A process according to claim 4 wherein said monoepoxy compound is butyl glycidyl ether.

6. A process according to claim 1, characterised in that quantity of epoxy binder from 1 to 8 kg. for every cu. m. of expanded polystyrene is used.

7. A process according to claim 1, characterised in that, in the aqueous dispersions, 10 to 30% by weight of hardeners are used for the epoxy binder.

8. A process according to claim 7, in which the hardeners are selected from the group consisting of methylene diamine, tetraethylene pentamine based adducts.

9. A process according to claim 1, wherein said aqueous dispersion further contains a surface-active agent.

10. A process according to claim 9, characterised in that the surface-active agent is selected from the group consisting of products of addition of ethylene oxide and alkyl phenols and the sulphonated alcohols.

11. A process according to claim 1, characterised in that in the manufacture of the mixtures which are subjected to hardening, proportions by weight of water:cement of 0.4:1 to 0.5:1 are maintained.

12. The process according to claim 9 wherein said surface active agent is 0.05 to 0.2% by weight of said aqueous dispersion.

13. A light building element having a density of 0.2 to 0.8 kg./cu. m. consisting essentially of hydraulic cement, water, and granular expanded polystyrene, said granular expanded polystyrene having a bulk density of 16 to 28 kg./cu. m. and having been homogeneously admixed before being blended with said hydraulic cement and said water with a dispersion consisting essentially of an epoxy binder and an organic solvent, said solvent being used in a quantity of 0.1 to 4.0 kg. to every cu. m. of particles of polystyrene and being selected from the group consisting of aliphatic and aromatic hydrocarbons said epoxy binder being a polyepoxy compound-monoepoxy compound mixture, the ratio by weight of polyepoxy compound-monoepoxy compound being between 0.3:1 and 1:1, and said granular expanded polystyrene being admixed with said epoxy binder before being blended with said hydraulic cement and said water.

14. In a process for the manufacture of light building elements having a density of 0.2 to 0.8 kg./cu. dm., by the hardening of a mixture comprising hydraulic cement, water, and granular expanded polystyrene having a bulk density of 16 to 28 kg./cu. m., the improvement comprising admixing said granular expanded polystyrene before being blended with said hydraulic cement and water, with a dispersion consisting essentially of an epoxy binder and an organic solvent, said solvent being used in a quantity of 0.1 to 4.0 kg. to every cu. m. of particles of polystyrene and being selected from the group consisting of aliphatic and aromatic hydrocarbons said epoxy binder being a polyepoxy compound-monoepoxy compound mixture, the ratio by weight of polyepoxy compound-monoepoxy compound being between 0.3:1 and 1:1, and said granular expanded polystyrene being admixed with said epoxy binder before being blended with said hydraulic cement and said water, whereby a homogeneous dispersion of granular expanded polystyrene and said epoxy binder is formed, said homogeneous dispersion then being admixed with said hydraulic cement and said water.

References Cited

UNITED STATES PATENTS

| | | | |
|---|---|---|---|
| 3,198,758 | 8/1965 | Donnelly | 260—2.5 EP |
| 3,272,765 | 9/1966 | Sefton | 260—2.5 B |
| 3,251,916 | 5/1966 | Newnham et al. | 260—2.5 B |
| 2,806,509 | 9/1957 | Bozzacco et al. | 260—2.5 B |
| 2,958,905 | 11/1960 | Newberg et al. | 260—2.5 B |
| 2,959,508 | 11/1960 | Graham et al. | 260—2.5 B |

MURRAY TILLMAN, Primary Examiner

M. FOELAK, Assistant Examiner

U.S. Cl. X.R.

260—2.5 EP, 29.2 EP, 29.6 S, 29.6 AB, 33.6 UA, 33.6 EP, 830 TW, 837 R

Disclaimer 3,705,117.—*Silvio Vargiu* and *Mario Pitzalis*, Milan, and *Pierluigi Abruzzi*, Bergamo, Italy. PROCESS FOR THE MANUFACTURE OF LIGHT BUILDING ELEMENTS. Patent dated Dec. 5, 1972. Disclaimer filed July 18, 1972, by the assignee, *Societa Italiana Resine S.p.A.*

Hereby disclaims the portion of the term of the patent subsequent to Dec. 5, 1989.

[*Official Gazette October 16, 1973.*]